United States Patent [19]

Kashio

[11] 3,959,625
[45] May 25, 1976

[54] CODED INFORMATION-READING DEVICE
[75] Inventor: Toshio Kashio, Tokyo, Japan
[73] Assignee: Casio Computer Co., Ltd., Tokyo, Japan
[22] Filed: Dec. 23, 1974
[21] Appl. No.: 535,695

[30] Foreign Application Priority Data
Dec. 26, 1973 Japan............................ 48-144074
May 13, 1974 Japan............................ 49-52266

[52] U.S. Cl.................... 235/61.11 E; 340/146.3 Z
[51] Int. Cl.² ......................................... G06K 7/10
[58] Field of Search ........................... 235/61.11 E; 340/146.3 Z

[56] References Cited
UNITED STATES PATENTS

| | | | |
|---|---|---|---|
| 3,731,064 | 5/1973 | Berler | 235/61.11 E |
| 3,737,632 | 6/1973 | Barnes | 235/61.11 E |
| 3,811,033 | 5/1974 | Herrin et al. | 235/61.11 E |

Primary Examiner—Vincent P. Canney
Attorney, Agent, or Firm—Flynn & Frishauf

[57] ABSTRACT

A coded information-reading device which comprises means for measuring the time of reading out a given piece of coded information consisting of a prescribed number of bits by determining a length of time required to read out two reading speed-detecting signals impressed immediately before and after said piece of coded information; means for dividing the determined reading time by said prescribed number of bits to measure the average per-bit reading time; and means for generating synchronizing clock pulses according to said average per-bit reading time, thereby successively reading out said prescribed number of bits constituting the following piece of coded information.

7 Claims, 16 Drawing Figures

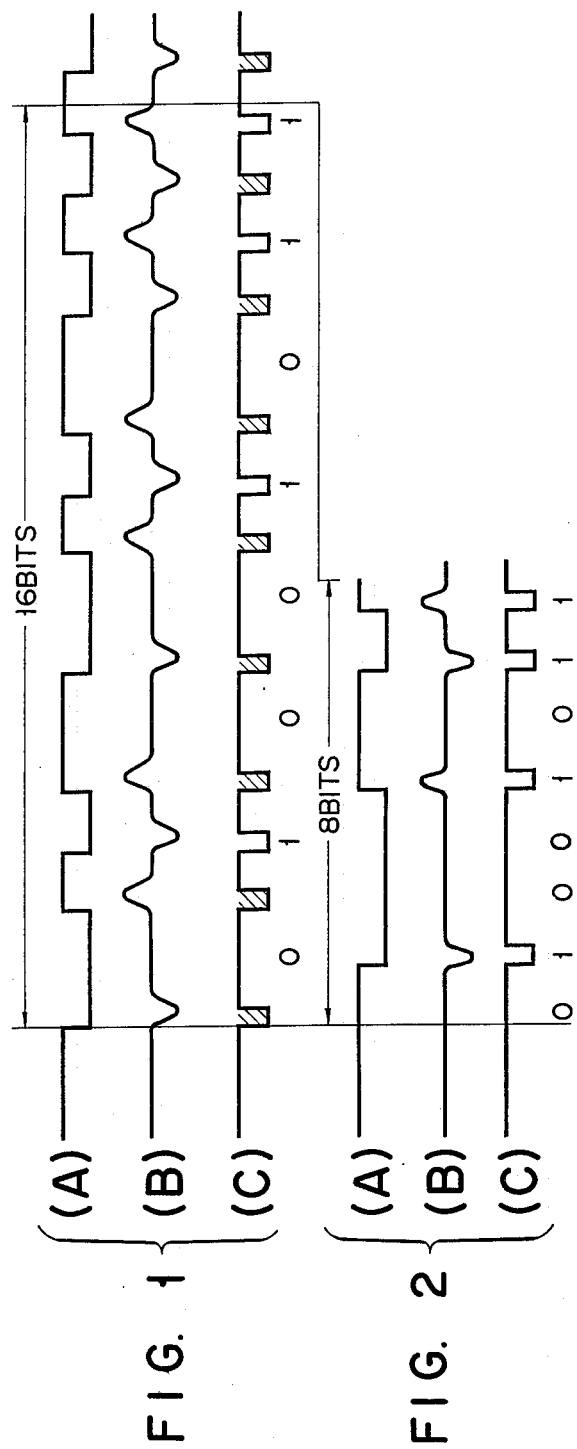

CODED INFORMATION-READING DEVICE

This invention relates to a coded information-reading device adapted to read out coded information which was recorded without synchronizing bits corresponding to the individual bits constituting said information.

For administration of, for example, inventories, it may be contemplated to record information on each of them on a card in a bar code and attach said card to the corresponding inventory. Reading of a code impressed on a recording paper is generally effected by delivering said recording paper to a feeder, carrying it forward mechanically at an equal speed and scanning the impressed code by an optical reading device at a uniform speed. If, in this case, either or both of the recording paper and reading device are made to travel at a prescribed relative speed, then the respective bits of a code impressed on the recording paper can be accurately detected by synchronizing signals delivered from a clock pulse generator, thereby attaining the correct reading of said coded information.

Where, however, a bar code impressed on a card is read, for example, by a manually operated pen-type optical reading device, detecting synchronizing signals are not always generated at positions exactly corresponding to the bits of coded information, thus, obstracting correct reading.

Particularly in the case of coded information where a prescribed positive level detected by scanning said information is taken as 1 and the zero level as 0, the positive level can be safely identified as 1. However, in the case the zero level is detected, it is impossible to judge whether said zero level represents 0 information or simply a space between the adjacent bits.

To eliminate such drawbacks, it has been considered to record coded information and at the same time synchronizing signals corresponding to the bits constituting said coded information, thereby reading out bit information by means of the recorded synchronizing signals. This process, however, requires an extra space to be provided on recording paper in order to record synchronizing signals and a reading device for reading out the recorded synchronizing signals, and further presents difficulties in accurately reading coded information and synchronizing signals manually at the same time.

To avoid such difficulties, it has hitherto been contemplated to use 1 and 0 bars bearing different widths. Where 0 bit information is thus indicated by a bar bearing a prescribed width, then the reading device always gives forth a reading pulse signal for each bit of a bar code, attaining distinction between 1 and 0 information from the width of a pulse signal thus generated. However, such process not only gives rise to complication in forming a bar code, but also requires a reading device to be additionally provided with means for distinguishing the widths of various pulses, resulting in the complicated arrangement of recording and reading devices.

The known methods of recording bit information are the FM and NRZ systems. The FM system consists in recording both bits representing coded information and synchronizing bits serially in alternate relationship in a single recording band.

Threfore, synchronizing bits are interposed at a prescribed interval regardless of the contents borne by the bits of coded information. According to the former FM system, where, as shown in FIG. 1A, reversion to the opposite level takes place during period in which rectangular wave signals repeat reversion between two levels, then this event is recorded as 1 and absence of such reversion is recorded as 0. Reading of information thus recorded is effected by the steps of generating differentiated output (FIG. 1B) corresponding to that portions of said rectangular wave signal which reverses from one level to the other, reversing the positive pulse component of said differentiated output, shaping said reversed positive pulse into a regular wave form pulse, obtaining bit information illustrated in FIG. 1C, and using the hatched ones of these pieces of bit information as synchronizing bits. As apparent form FIG. 1C, coded information lies between two synchronizing bits. In the case of FIG. 1, the coded information comprises eight bits of (01001011).

With the above-mentioned FM system, however, a synchronizing bit has to be recorded for each bit of coded information, and the synchronizing bits and the bits of coded information are linearly arranged in alternate relationship. Therefore, recording of 8-bit information requires a memory device to have a sufficient capacity to be stored with 16-bit inforamtion. Therefore, the FM system prevents the capacity of said memory device from being effectively utilized, takes much time in recording and reading and proves unadapted for high speed treatment of information.

In contrast, the NRZ system causes only coded bit information to be stored as shown in FIGS. 2A to 2C, also requireing synchronizing bits (not shown) to be used for the reading of said coded bit information. Therefore, the NRZ system renders a recording and reading device as much complicated in arrangement as the FM system.

It is accordingly the object of this invention to provide an inexpensive device of simple arrangement for the reading of coded information which enables recorded coded infromation to be accurately read out without using a synchronizing bit for each bit of coded information, thereby increasing the density with which coded information as stored in a memory device.

SUMMARY OF THE INVENTION

According to an aspect of this invention, there is provided a coded information-reading device which comprises means for measuring the time of reading out a given piece of coded information consisting of a prescribed number of bits by determining a length of time required to read out two reading speed-detecting signals impressed immediately before and after said piece of coded information; means for dividing the measured reading time by said prescribed number of bits to determine the average per-bit reading time; and means for generating synchronizing clock pulses according to said average per-bit reading time, thereby successively reading out said prescribed number of bits constituting the following piece of coded information.

BRIEF DESCRIPTION OF THE DRAWINGS

The foregoing and other features and advantages of this invention will be apparent from the following more particular description of the preferred embodiments of the invention as illustrated in the accompanying drawings, in which:

FIGS. 1A to 1C present the wave forms of signals by way of illustrating the manner in which coded information is recorded and read out by the prior art FM system;

FIGS. 2A to 2C show the wave forms of signals by way of illustrating the manner in which coded information as recorded and read out by the prior art NRZ process;

DETAILED DESCRIPTION OF ILLUSTRATED EMBODIMENTS

Figure 3:
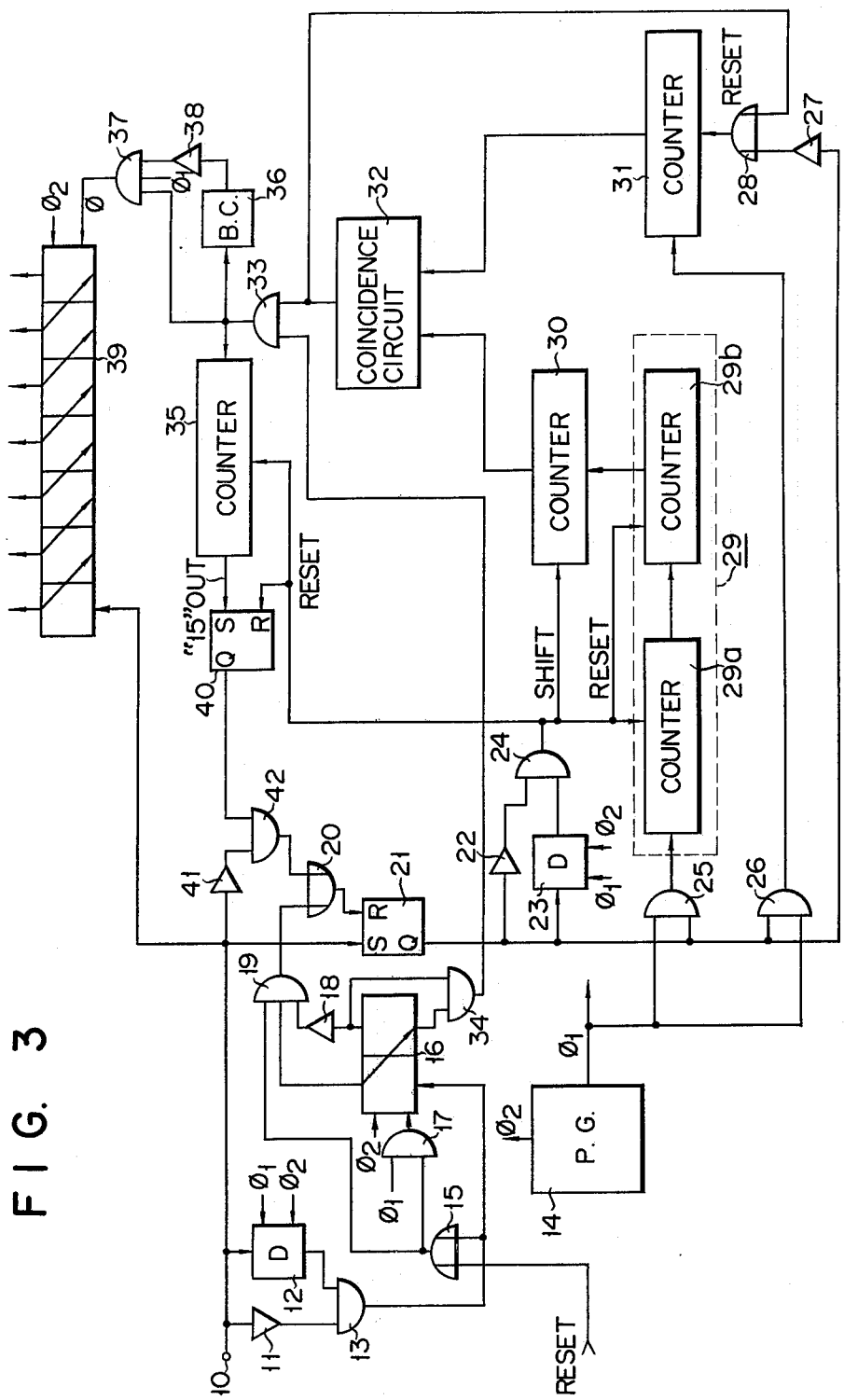
FIG. 3 is a block circuit diagram of a coded information-reading device according to an embodiment of this invention.
Figure 4:
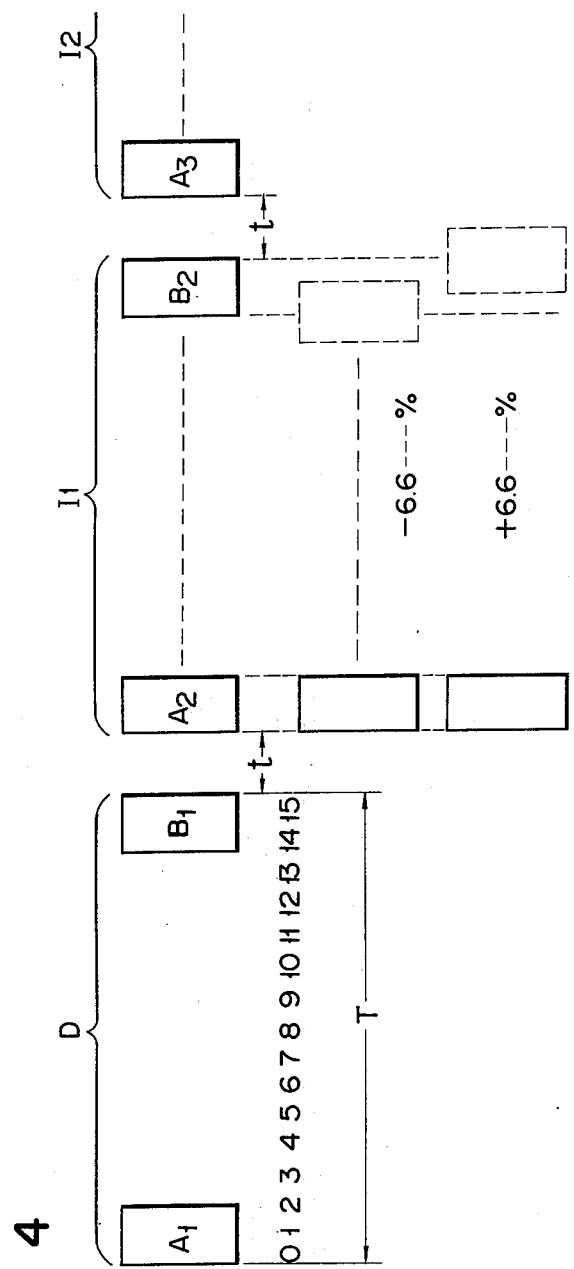
FIG. 4 indicates the contents of coded information read out by the device of FIG. 3.

Referring to FIG. 3, an information input terminal 10 is supplied with input pulse information obtained by scanning a bar code shown in FIG. 4 by, for example, a pen-type optical reading device (not shown). The bar code of FIG. 4 consists of eight code elements or bits, the foremost and rearmost ones of which act as synchronizing bits A, B for detecting the speed of reading said bar code information. The rearmost detecting synchronizing bit B1 of the preceding piece of bar code information is spaced at a prescribed interval t from the foremost detecting synchronizing bit A2 of the succeeding piece of bar code information as shown in FIG. 4.

Bar code information supplied to the input terminal 10 is first conducted to an inverter 11 and delay circuit 12. Outputs from the inverter 11 and delay circuit 12 are conducted to the input terminal of an AND circuit 13. These inverter 11, delay circuit 12 and AND circuit 13 jointly constitute a one-shot circuit which gives forth one output pulse signal rising in response to the rear end of an input pulse. The delay circuit 12 is controlled by a first clock pulse $\phi_1$ produced by a clock pulse generator 14 and a second clock pulse $\phi_2$ which is also generated by the generetor 14 and has the same frequency as the first clock pulse $\phi_1$ and the phase of which is shifted 180° from said first clock pulse $\phi_1$. An output signal from the AND circuit 13 is delivered to the input terminals of an OR circuit 15 supplied with an external reset signal and a binary couter 16. When receiving from an AND circuit 17 an output generated by the arrival of both an output signal from the OR circuit 15 and the first clock pulse $\phi_1$, the counter 16 carries out a write-advancing operation. The data stored in said counter 16 is read out by the second clock pulse $\phi_2$. The output from the OR circuit 15 and the first order output from the counter 16 and second order output from the counter 16 conducted through an inverter 18 are supplied to the input terminal of an AND circuit 19. Output from the AND circuit 19 is delivered to the reset terminal of a flip-flop circuit 21 through an OR circuit 20.

The set terminal of the flip-flop circuit 21 is supplied with input pulses denoting coded information delivered from the input terminal 10 of the coded information-reading device of FIG. 3. Set output from the flip-flop circuit 21 is supplied to the input terminal of an AND circuit 24 through an inverter 22 and delay circuit 23. Said output pulse is also delivered as a gating signal to AND circuits 25, 26 which receive the first clock pulse $\phi_1$ from the pulse generator 14, and further to the input terminal of an OR circuit 28 through an inverter 27. The delay circuit 23 is similarly controlled by the first and second clock pulses $\phi_1$, $\phi_2$. The inverter 22, delay circuit 23 and AND circuit 24 jointly constitute a one-shot circuit producing a pulse signal which rises in response to the fall of a set output signal from the flip-flop circuit 21. An output signal from the AND circuit 25 is delivered to the input terminal of the first counter 29a of a counter circuit 29 to be counted thereby. According to this embodiment, the counter 29a is a 16-scale type. A carry signal for the counter 29a is supplied to the input terminal of a 100-scale counter 29b. Since, in this embodiment, one character information consists of eight bits, the 16-scale counter 29a is used. Where, however, one character information is formed of six bits, then a 12-scale counter is applied. This reason will be given later. Upon receipt of a shift-instructing signal from the AND circuit 24, a counter value made by the 100-scale counter 29b is shifted to a similar 100-scale counter 30 to be stored therein.

An output signal from the AND circuit 24 is supplied as a reset signal to the counters 29a, 29b. An output signal from the AND circuit 26 is delivered as a count-advancing signal to another 100-scale counter 31 which is reset by an output signal from an OR circuit 28. A counting value made by the counter 31 and that made by the counter 30 are jointly supplied to a coincidence circuit 32, an output signal from which is conducted to one input terminal of an AND circuit 33 and also to one input terminal of the OR circuit 28. The other input terminal of the AND circuit 33 is gated by an output signal from an AND circuit 34 which is supplied with a first order output signal and a second order output signal both delivered from the binary counter 16. Namely, where a counting value made by the binary counter 16 is represented by (1, 1), then the AND circuit 34 gives forth an output signal to the AND gate 33.

An output signal from the AND circuit 33 is conducted to the count input terminals of a 16-scale counter 35 and a binary counter 36 and also to one input terminal of an AND circuit 37. This AND circuit 37 is further supplied with a clock pulse $\phi_1$ and an output signal from the binary counter 36 through an inverter 38. The AND circuit 37 generates an output pulse signal in synchronization with the clock pulse $\phi_1$. Said output pulse signal is delivered as a shift-instructing signal $\phi$ to a 7-bit shift circuit 39. The input terminal of this shift circuit 39 is supplied with the input pulse information previously delivered to the input terminal 10 of the subject coded information-reading device of FIG. 3 to read out coded information for each bit.

A carry signal from the 16-scale counter 35 is supplied to the set input terminal of a flip-flop circuit 40, a set output signal from which is delivered to the input terminals of an AND circuit 42 together with an output signal from an inverter 41. The input side of the inverter 41 is supplied with pulse information from the input terminal 10 of the subject reading device. An output signal from the AND circuit 42 is conducted to the reset terminal of the flip-flop circuit 21 through the OR circuit 20. The counter 35 and flip-flop circuit 40 are so connected as to be reset by an output signal from the AND circuit 24.

FIG. 4 presents a bar code denoting pulse information being supplied to the coded information-reading device of FIG. 3. A bar code representing one character consists of six bits. Two reading speed-detecting synchronizing bits A, B are provided immediately before and after the 6-bit bar code information. Where an optical reading device of, for example, the pen-type carries out scanning starting with the foremost detecting synchronizing bit successively in the direction in which said bar code information is recorded, then a series of pulses are obtained which correspond to the respective code elements or bits of said information. One character represented by an 8-bit bar code (including the foremost and rearmost detecting synchronizing bits) generally has a very narrow width as about 3 mm. Therefore, at least two characters (6 mm) can be scanned by, for example, a portable pen-type optical reading device substantially at the same speed.

There will now be described the operation of a coded information-reading device according to the embodiment of FIG. 3. When the bar code information of FIG. 4 is scanned from the left to the right by, or example, a portable pen-type reading device, then a pulse signal rises in response to the left side of the foremost synchronizing bit A1 of the detection code D for detecting the reading speed. When said pulse is supplied to the input terminal 10 of the subject coded information-reading device, then the flip-flop circuit 21 is set to deliver a gating signal to the AND circuit 25. Thus, a clock pulse from the pulse generator 14 is conducted to the counter circuit 29 through the AND circuit 25, later when the pulse signal falls in response to the right side of said synchronizing bit A1, then the AND circuit 13 produces an output signal, causing 1 to be written in the first order section of the binary counter 16 and bringing the count stored therein to (1, 0).

Where the input terminal 10 is supplied with a pulse corresponding to the rearmost detecting synchronizing bit B1 of the detection code D, then the AND circuit 13 again generates an output signal in response to the fall of said input pulse. Since, at this time, the count stored in the counter 16 is (1, 0), the AND circuit 19 is gated by an output signal from the OR circuit 15, a first order output signal from the counter 16 and an output signal from the inverter 18. An output signal from the AND circuit 19 is supplied to the reset terminal of the flip-flop circuit 21 through the OR circuit 20 to reset said flip-flop circuit 21. At this time, the AND circuit 17 has its gate opened by an output signal from the OR circuit 15 to supply a shift-instructing signal to the counter 16, causing the count 1 stored in the first order section of said counter 16 to be shifted to the second order section thereof and the first order section thereof to be stored with a count 1 by an output from the AND circuit 13. Thus the counter 16 is stored with a count (1, 1). When the flip-flop circuit 21 is reset, the gate of the AND circuit 25 is closed to bring counting by the counter circuit 29 to an end. Accordingly, the counter circuit 29 continues to count the number of pulses $\phi_1$ generated during a period T shown in FIG. 4. The number of pulses thus counted corresponds to a length of time required for information of one character to be scanned by the aforesaid portable pen-type reading device.

Since the counter circuit 29 consists of a 16-scale counter 29a and 100-scale counter 29b, the latter 100-scale counter 29b counts a value equal to 1/16 of the total number of pulses $\phi_1$ supplied to the counter circuit 29. Since one character represented by the bar code consists, as previously described, of eight bits (including two detecting synchronizing bits), the counter 29b makes a count corresponding to a length of time required for half width of each bit-bar to be scanned. When the flip-flop circuit 21 is reset, then a set signal previously supplied thereto falls. At this point, the AND circuit 24 delivers a shift-instructing signal to the counter 30, causing the count of the counter 29b to be shifted to the counter 30 and the counter circuit 29 to be reset.

A prescribed length of time $t$ after reading the rearmost detecting synchronizing bit B1 of the preceding piece of bar code information D, the foremost detecting synchronizing bit A2 of the succeeding piece of bar code information I1 is read. As the result, the flip-flop circuit 21 is again set and the counter circuit 29 resumes counting. At this time, the AND circuit 26 delivers a pulse signal to the counter 31, which in turn commences counting again. When coincidence is established between the count of the counter 31 and that of the counter 30. Then the coincidence circuit 32 delivers a signal to the reset terminal of the counter 31 and to the AND circuit 33 to open the gate of the AND circuit 33, which is turn carries out counting again.

Thus the coincidence circuit 32 delivers an output signal to the AND circuit 33 for each period in which the pen-type reading device scans half of each bit-bar included in the aforesaid 8-bit bar code information. Since the AND gate 34 gives forth an output signal of 1, the AND gate 33 delivers an output signal to the counter 35 and binary counter 36. Each time the binary counter 36 receives two output signals from the AND gate 33, namely, for each bit constituting the 8-bit bar code information, said binary counter 36 delivers one output signal to the inverter 38. Though, in this case, the counter 16 has its stored data shifted each time a pulse signal is supplied thereto, yet the data stored in said counter 16 always maintains a value of (1, 1). Therefore, the AND circuit 34 always delivers a gating signal to the AND circuit 33.

After the foremost detecting synchronizing bit A2 of the 8-bit bar code information is read out, the gate of the AND circuit 37 is opened by an output from the inverter 38 for each bit of said bar code information. The AND circuit 37 generates a synchronizing bit signal for reading out each bit of the bar code information at the very moment when each said bit is scanned. Thus, a signal denoting each bit of the bar code information supplied to the input terminal 10 of the subject coded information-reading device is successively stored in the shift circuit 39 upon receipt of a shift-instructing pulse $\phi$.

When the 8-bit bar code information is all stored in the shift circuit 39, then the 16-scale counter 35 gives forth a carry signal to set the flip-flop circuit 40. If, in this case, the input terminal 10 of the above-mentioned reading device is not supplied with any input pulse information, then the flip-flop circuit 21 is reset by the output signal which the AND circuit 42 produces upon receipt of an output signal from the inverter 41 and a set output signal from the flip-flop circuit 40. When the flip-flop circuit 21 is thus reset, the counter 35 and the flip-flop circuit 40 are also reset. At the resetting of said flip-flop circuit 21, the counter 30 is stored with a counting value denoting a length of time required for half of each bit of the bar code information to be read.

According to the coded information-reading device of FIG. 3, determination is first made of a period of whcih the foremost and rearmost synchronizing bits used to detect the time of reading the bar code information are read out. Then a length of time required for each bit of the bar code information to be scanned is measured from said determined period. Each bit of the succeeding piece of bar code information is read out at the end of each one bit-scanning time thus measured. When each one bit-scanning time is measured, determination is also made of a time interval between the rearmost detecting synchronizing bit (for example, B1) of the preceding piece of bar code information D and the foremost detecting synchronizing bit (for example, A2) of the succeeding piece of bar code information I1. As mentioned above, 8-bit bar code information (including the foremost and rearmost detecting synchronizing bits A, B) representing one character has a very narrow width, so that bar code information corresponding to two characters which has a width of about 6 mm can be read out in a substantially equal time for each character even by, for example, a portable manually operable pen-type reading device. The above-mentioned arrangement enables a detecting synchronizing bit signal for reading out each bit of bar code information to be generated at an accurate point of time. Particularly the embodiment of FIG. 3 is so designed as to generate a detecting synchronizing bit exactly at the middle point of each bit-bar of bar code information. Therefore, synchronization is attained between the detecting synchronizing bit and each bit of bar code information, insofaras the scanning speed only varies to an extent equal to 1/16 of an entire period required for all the bar code information to be scanned, namely up to an extent of ±6.6%. Therefore, even applications of the portable pen-type reading device can realize fully accurate reading.

Figure 5:
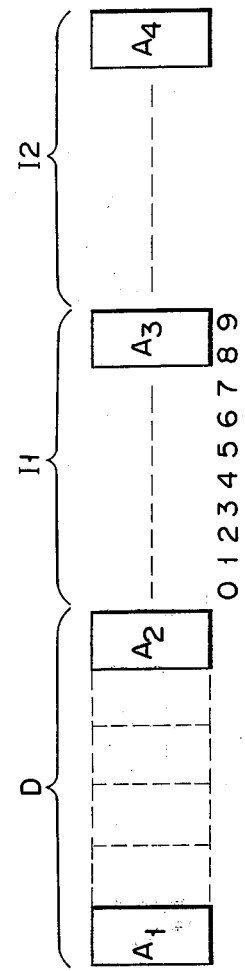
FIG. 5 presents the contents of another piece of coded information read out by the device of FIG. 3.

The foregoing description of the embodiment of FIG. 3 refers to the case where the bar code information representing one character had two detecting synchronizing bits A, B provided at the foremost and rearmost positions respectively. However, it is possible, as shown in FIG. 5, to make the latter synchronizing bit A2 of the reading speed-detecting code D concurrently act as the foremost synchronizing bit of the succeeding piece I1 of bar code information and similarly make the rearmost synchronizing bit A3 of the piece I1 concurrently act as the foremost synchronizing bit of the further succeeding piece I2 of bar code information. Obviously in this case, no time interval is provided between two adjacent pieces of bar code information.

Figure 6:
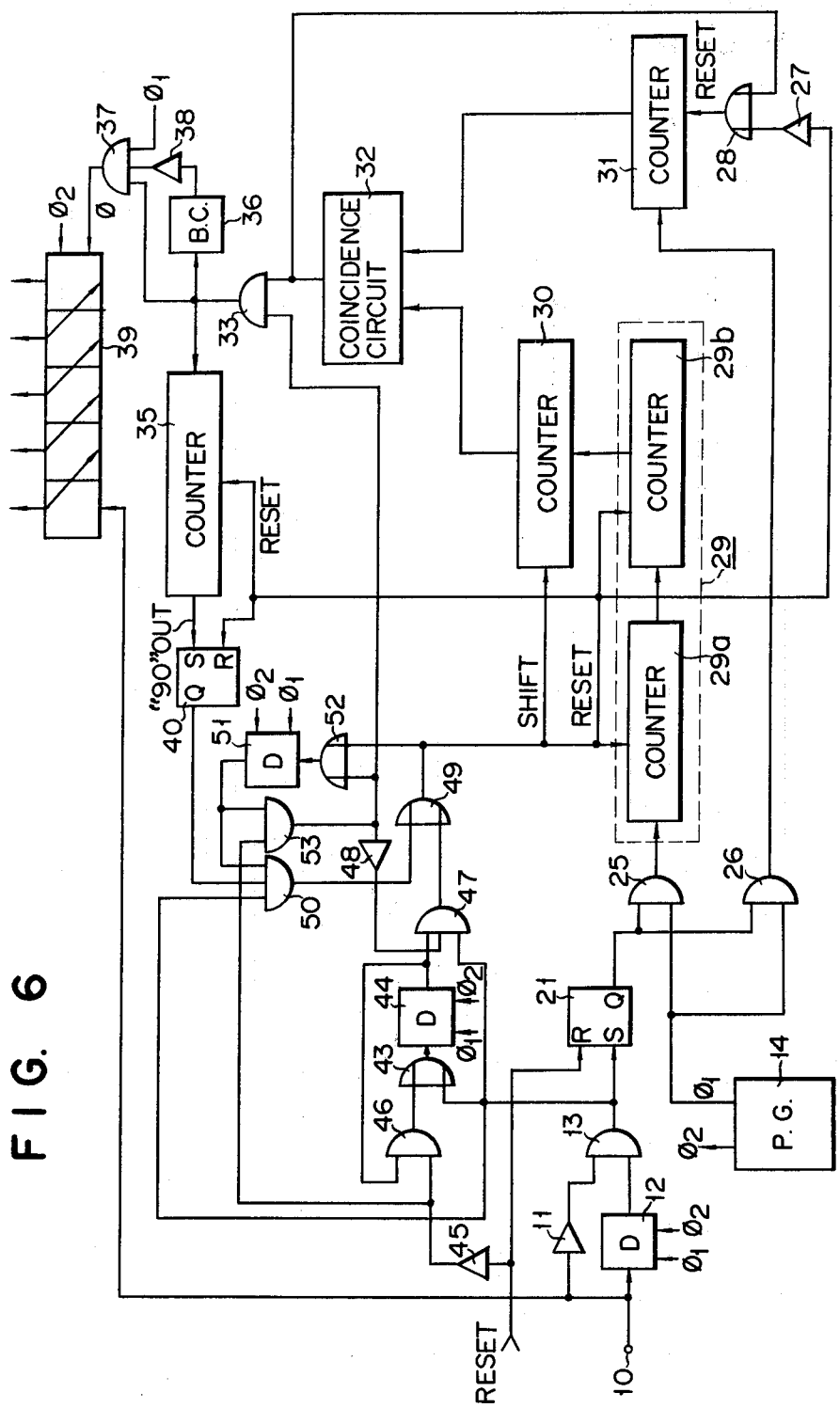
FIG. 6 is a block circuit diagram of a coded information-reading device according to another embodiment of the invention for reading out the coded information illustrated in FIG. 5.

FIG. 6 shows the circuit arrangement of a coded information-reading device according to another embodiment of this invention using such bar code information as illustrated in FIG. 5. The parts of FIG. 6 the same as those of FIG. 3 are denoted by the same numerals. When the bar code information shown in FIG. 5 begins to be scanned, a pulse signal corresponding to the foremost detecting synchronizing bit A1 is first supplied to the input terminal 10 of the coded information-reading device of FIG. 6. The AND circuit 13 gives forth an output signal in response to the fall of said pulse. This output signal is conducted through an OR circuit 43 to a delay circuit 44 operated by clock pulses $\phi_1$, $\phi_2$. An output signal from the delay circuit 44 is delivered to the input terminal of an AND circuit 46 together with an output signal from an inverter 45. Where the inverter 45 is not supplied with a reset signal, then an output signal from the AND circuit 46 is fed back to the delay circuit 44 through the OR gate 43, causing the delay circuit 44 always to produce an output signal of 1. An output signal from the AND circuit 13 also sets the flip-flop circuit 21. Accordingly, the counter circuit 29 commences the counting of clock pulses $\phi_1$ as in the embodiment of FIG. 3.

Where a pulse signal corresponding to the rearmost detecting synchronizing bit A2 of the piece D is delivered to the input terminal 10 of the coded information-reading device, then the AND circuit 13 produces an output signal in response to the fall of said pulse signal. The gate of the AND circuit 47 is opened by this output signal, and those from the delay circuit 44 and inverter 48. An output signal from the inverter 48 retains a level of 1 until the bar code information is read out in the later described manner. An output signal from the AND circuit 13 is supplied as a shift-instructing signal to the counter 30 through the AND circuit 47 and OR circuit 49. As the result, the count stored in the counter 29b is shifted to the counter 30, causing both counters 29a, 29b to be reset. According to the embodiment of FIG. 6, one character is assumed to consist of five bits. Therefore, the counter 29a is of the 10-scale type.

The counter 30 is stored with a count corresponding to a length of time required for half of each bit-bar of bar code information to be scanned. Since, under this condition, the flip-flop circuit 21 remains set, the counters 29a, 29b are reset and again begin to count clock pulses $\phi_1$. At this time, the counter 31 also commences counting.

Where coincidence is established between the counts made by the counters 30, 31, then the coincidence circuit 32 gives forth, as in the preciding embodiment of FIG. 3, an output signal corresponding to a length of time required for half of each bit-bar of bar code information to be scanned.

An output signal from the OR circuit 49 is further supplied to the delay circuit 51 through the OR circuit 52. An output signal from the delay circuit 51 operated by clock pulses $\phi_1$, $\phi_2$ is conducted to one input terminal of each of the AND circuits 50, 53. Where the counter 35 counts a smaller number than 9 and no external reset signal is supplied, the gate of the AND circuit 53 is opened. An output signal from said AND circuit 53 is fed back to the delay circuit 51 through the OR circuit 52. Under this condition, an output signal from the delay circuit 51 retains a level of 1. An output signal from the AND circuit 53 is supplied as a gating signal to the AND circuit 33. An output signal from the coincidence circuit 32 is delivered through the AND gate 33 to the counter 35 and binary counter 36. A signal denoting each bit of the bar code information supplied to the input terminal 10 of the reading device of FIG. 6 is successively stored in the shift circuit 39.

Where the counter 35 makes ten counts from 0 to 9, then the flip-flop circuit 40 is set by a carry signal of the counter 35 and a set output signal from said flip-flop circuit 40 is delivered to one input terminal of the AND circuit 50. Where, under this condition, a pulse corresponding to the detecting synchronizing bit A3 of FIG. 5 falls, then the AND circuit 13 supplies an output signal to the AND circuit 50, which is gated by a 1 output signal from the delay circuit 51. An output signal from the AND circuit 50 is supplied through the OR circuit 49 to the OR circuit 52, counters 30, 29a, 29b, inverter 27, counter 35 and flip-flop circuit 40 in turn. Thus the subject coded information-reading device of FIG. 6 is brought back to the state in which the synchronizing bit A2 was detected. The AND gate 37 generates an information-reading signal in timing corresponding to the count which is stored in the counter 30, each time a synchronizing bit following the synchronizing bit A4 (FIG. 5) is detected. The counter 29b is set at a count for forming a signal used in reading the succeeding piece of bar code information. The above-mentioned arrangement enables each bit of bar code information shown in FIG. 5 to be accurately read out.

There will now be described by reference to FIGS. 7 and 8 another embodiment of this invention wherein input information is arranged by the non-return-to-zero (NRZ) system as shown in FIGS. 2A to 2C. The parts of FIG. 7 the same as those of FIGS. 3 and 6 are denoted by the same numerals. Information being read is preceded, as shown in FIG. 8A, by a pair of synchronizing bits S1, S2 spaced from each other at a prescribed interval. 8-bit information consisting of, for example, (01001011) is previously recorded in succession to the latter synchronizing bit S2. Said 8-bit information is succeeded by a third synchronizing bit S3 which in turn is followed by another piece of bar code information.

When expressed by the NRZ system, signals denoting said 8-bit bar code information having the synchronizing bits S1, S2, S3 periodically interposed therein present the rectangular wave forms indicated in FIG. 8B. The 8-bit bar code information represented by signals bearing such wave forms is first supplied to a differentiation circuit (not shown) included in the reader 1 of FIG. 7, where the signals of said information are inverted into inpulse signals shown in FIG. 8C. Thereafter said information signals are changed into pulse signals (FIG. 8D) by a proper wave form converter 2. The hatched bit pulses of FIG. 8D correspond to the synchronizing bits S1 to S3.

An output signal from the wave form converter 2 is conducted to the delay circuit 12a, an output from which is delivered to one input terminal of each of the delay circuit 12b and AND circuit 13. An output signal from the delay circuit 12b is supplied to the other input terminal of the AND circuit 13 through the inverter 11. The delay circuits 12a, 12b are so controlled as to be supplied with an input signal in response to a clock pulse $\phi_1$ and generate an output signal in response to a clock pulse $\phi_2$. When an output signal from the delay circuit 12a rises, an output signal from the AND circuit 13 also rises. This output signal from the AND circuit 13 continues to be 1 signal until an output signal from the delay circuit 12b rises.

An output signal from the AND circuit 13 is transmitted to the set terminals of the flip-flop circuits 21, 60 and one input terminal of the AND circuit 47 and also to the delay circuit 14 through the OR circuit 43. An output signal from the delay circuit 44 is delivered to the second input terminal of the AND circuit 47 and fed back to the input side of the delay circuit 44 through the AND circuit 46 and OR circuit 43. Where no external reset signal is introduced, the AND circuit 46 is gated by a 1 output signal from the inverter 45. An output signal from the delay circuit 44 always retains a level of 1 by an output signal from the AND circuit 13. Where bar code information is recorded in a magnetic disk, the inverter 45 is supplied with a sector signal or index signal as a reset signal. This reset signal is also carried to the reset terminal of the flip-flop circuit 21.

An output signal from the flip-flop circuit 21 set by an output signal from the AND circuit 13 is supplied as a gating signal to the AND circuits 25, 26 as in FIGS. 3 and 6. The counter 29a counts the number of clock pulses $\phi_1$ supplied thereto. Since, according to the embodiment of FIG. 7, one character consists of nine bits (including a synchronizing bit S), the counter 29a is of the 18-scale type. The input terminal of the AND circuit 33 is supplied with an output signal from the coincidence circuit 32 and set output signals from the flip-flop circuits 40, 61. An output signal from the AND circuit 37 is delivered to the input terminal of the AND circuit 62 together with an output signal from the counter 35, which shows that said counter 35 has already made a count. An output signal from the AND circuit 62 is transmitted as a shift-instructing signal to the shift circuit 39. An output signal from the AND circuit 37 is also supplied to the reset terminal of the flip-flop circuit 60 through the delay circuit 63. A set output signal from the flip-flop circuit 60 is conducted as an information-reading bit to the input terminal of the shift circuit 39 and one input terminal of the AND circuit 64. The signals of the respective bits of bar code information denoting one character which are supplied to the AND circuit 64 may be separately drawn out in series under the control of the output from the AND circuit 62. The signals of the respective bits of bar code information representing one character which are stored in the shift circuit 39 may be drawn out in parallel at the same time. The circuit arrangement of the remainder of the coded information-reading device of FIG. 7 is the same as those of the embodiments of FIGS. 3 and 6.

Figure 7:
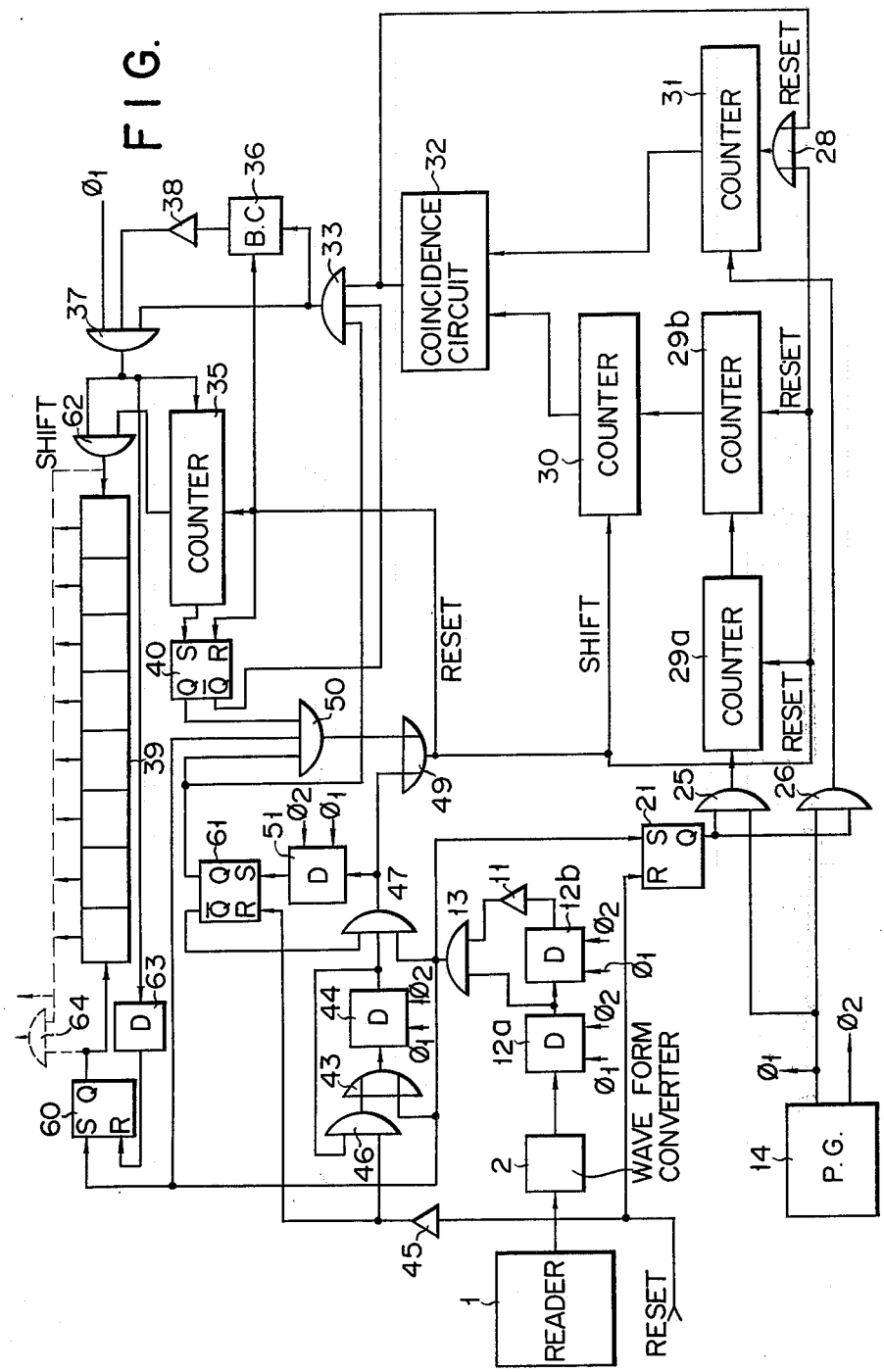
FIG. 7 is a block circuit diagram of a coded information-reading device according to still another embodiment of the invention.
Figure 8:
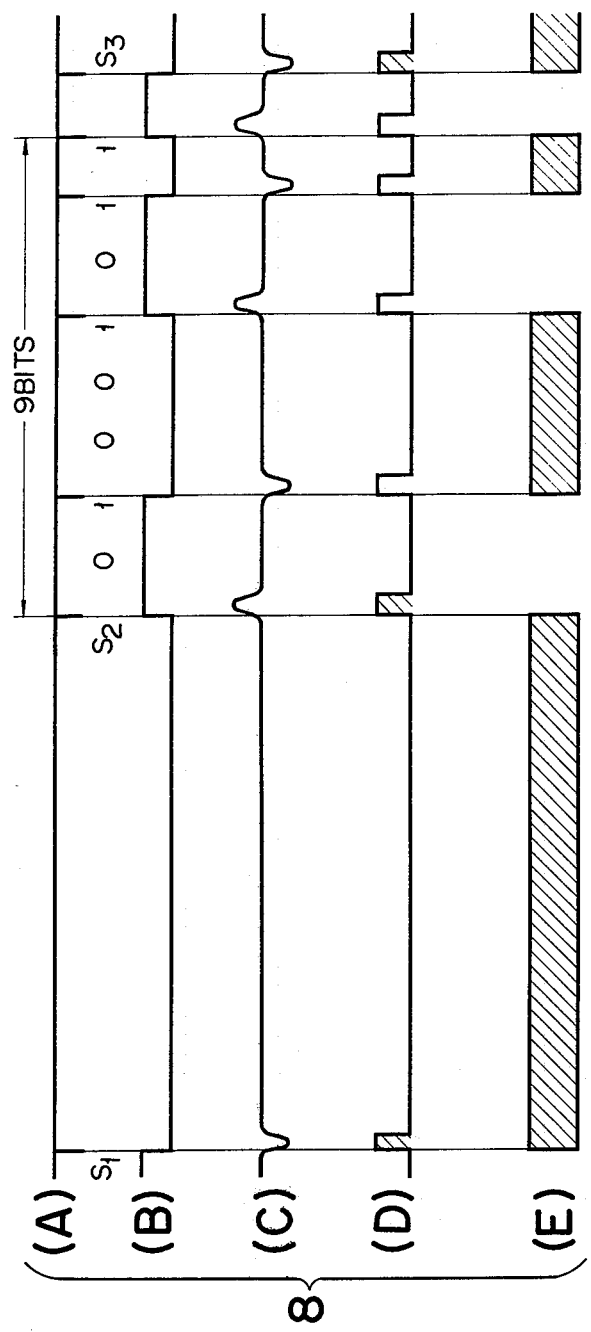
FIG. 8A to 8E sets forth the wave forms of signals for reading out coded information by the reading device of FIG. 7.

Referring to the circuit arrangement of FIG. 7, before the reader 1 commences the reading of bar code information, the subject reading device is supplied with a signal from, for example, the index or sector section of the magnetic disk, and still is in a state free from information.

Therefore, the flip-flop circuit 21 and the counters 29a, 29b, 31 are reset. Where, under this condition, the reader 1 commences the reading of information, the inverter 45 produces a 1 output signal to reset the flip-flop circuit 61 and the AND circuit 46 is supplied with a gating signal. Where, at this time, the wave form converter 2 generates a pulse signal corresponding to the synchronizing bit S1 of FIG. 8D, then an output signal from the AND circuit 13 rises with a delay caused by the delay circuit 12a. When said delayed output signal from the AND circuit 13 is transmitted to the AND circuit 47, then an output signal from the delay circuit 44 retains a level of 1. Since an output signal from the delay circuit 44 rises after the fall of an output signal from the AND circuit 13. The AND circuit 47 does not produce any output signal in response to a pulse signal representing the synchronizing bit S1. Since the flip-flop circuit 21 is set by an output signal from the AND circuit 13, the counters 29a, 29b, 31 count the number of pulse signals $\phi_1$.

Where the reader 1 gives forth a pulse signal corresponding to the synchronizing bit S2, then the AND circuit 13 again generates an output signal, which is delivered to the AND circuit 47. Since, at this time, the delay circuit 44 produces a 1 output signal, the AND circuit 47 has its gate opened and sends forth an output signal to the delay circuit 51 and OR circuit 49. A prescribed length of time determined by the delay circuit 51 after the AND circuit 47 generates an output signal, the flip-flop circuit 61 is set to cause the AND circuit 47 to have its gate closed. An output signal from the AND circuit 47 which has been transmitted to the OR circuit 49 resets the counters 29a, 29b, 31, causing the count stored in the counter 29b to be shifterd to the counter 30. Since, as mentioned above, the gate of the AND circuit 47 is closed with a prescribed time delay, the counters 29a, 29b, 31 again commences counting immediately after reset. Where coincidence is attained between the counts made by the counters 31, 30, then the coincidence circuit 32 generates an output signal, which is transmitted to the reset terminal of the counter 31 and also to the AND circuit 33. Since, under this condition, the flip-flop circuit 40 is reset and the flip-flop circuit 61 is set, an output signal from the AND circuit 33 is conducted to the input terminals of the AND circuit 37 and binary counter 38. Accordingly, the AND circuit 37 gives forth a pulse signal corresponding to the point of time at which the respective bits of bar code information including synchronizing bits S1 . . . Sn are detected. Where the counter 35 is stored with some count, an output signal from the AND circuit 37 is supplied as a shift-instructing signal to the shift circuit 39 through the AND circuit 62 which is gated by a signal showing that said counter 35 has already been stored with a count. A prescribed length of time determined by the delay circuit 63 after the AND circuit 37 generates an output signal, the flip-flop circuit 60 is reset by an output signal from the delay circuit 63.

The flip-flop circuit 60 is set by an output signal from the AND circuit 13, namely, in response to a reading pulse signal from the reader 1. Since, in the case of the bar code information of FIG. 8, the first bit is 0, the flip-flop circuit 60 supplies a 0 output signal to the shift circuit 39, when the AND circuit 37 gives forth the first synchronizing signal. Since the second bit of said information is 1, the flip-flop circuit 60 is set by a 1 output signal from the AND circuit 13. Thus the shift circuit 39 is supplied with a 1 signal in response to the second synchronizing signal.

When the AND circuit 37 generates nine synchronizing signals, the counter 35 delivers a carry signal to the flip-flop circuit 40 to set it, causing the AND circuit 33 to have its gate closed. Since a set output signal from the flip-flop circuit 40 is supplied as a gating signal to the AND gate 50, a pulse signal corresponding to the synchronizing bit S3 is produced from the wave form converter 2, causing the AND circuit 13 to generate an output signal. At this time, the AND circuit 50 delivers a reset signal through the OR circuit 49 to the counters 29a, 29b, 31, 35, binary counter 38 and flip-flop circuit 40. When the counter 30 receives a shift-instructing signal, the following information-reading cycle is commenced. Where the flip-flop circuit 40 is set and the shift circuit 39 is supplied with a reading-instructing signal, then the eight bits of information representing one character can be read out in parallel at the same time. Therefore bar code information arranged by the NRZ system and represented by signals bearing rectangular wave forms shown in FIG. 8B can be accurately read out with great ease. As mentioned above, the NRZ system information impressed on a magnetic recording medium is denoted by signals bearing the rectangular wave forms as shown in FIG. 8B. Where, however, said information is to be visibly recorded on, for example, paper tape, the signals of FIG. 8B can be easily reproduced by forming said information, as illustrated in FIG. 8E, of black (hatched) and white (blank) sections and reading these sections optically.

As mentioned above, provision of a very few synchronizing bits according to this invention eliminates the necessity synchronizing bits according to this invention eliminates the necessity of any extra device designed to detect a code of a synchronizing signal, enabling, for example, bar code information to be read out unfailingly and effectively. Where the information-reading system of this invention is applied to a magnetic drum or disk, it is unnecessary to provide control means for fixing the rotating speed of such drum or disk as has been the case with the prior art information-reading device. Therefore, this invention can provide an information-reading device which only requires rotating means of very simple construction and save the reading section from a complicated circuit arrangement.

What is claimed is:
1. A bar-coded information reading device comprising:
   reading means for reading a number of pieces of coded information serially recorded on a recording medium, each piece of information including the same number of bits and having two synchronizing bits added thereto, one synchronizing bit being arranged immediately before, and the other synchronizing bit being arranged immediately after a respective piece of information, all of said bits being arranged at equal intervals on the recording medium;
   pulse generating means for generating pulses of a constant frequency;
   counting means coupled to said pulse generating means for counting the pulses generated by said pulse generating means during the period between the reading of the synchronizing bit arranged immediately before each piece of information and the reading of the synchronizing bit arranged immediately after the respective piece of information;
   division means coupled to said counting means for dividing the count value of said counting means by the number of bits constituting the respective piece of information;
   signal generating means coupled to said division means for generating synchronizing signals in accordance with the quotient obtained by said division means; and
   means coupled to said generating means and to said reading means for causing said reading means to read the bits of each piece of information one-by-one every time said signal generating means generates one synchronizing signal.

2. An information reading device according to claim 1, wherein the synchronizing bit that is provided at the rearmost part of one piece of coded information concurrently acts as the synchronizing bit provided at the foremost part of the succeeding piece of coded information.

3. An information reading device according to claim 1, wherein said reading means include means for reading information arranged by the non-return-to-zero (NRZ) system and a wave form converter for converting the wave form of output signals from said reader into signals which denote information arranged by the return-to-zero (RZ) system.

4. An information reading device according to claim 1 wherein:

said counter means includes a first counter having a double scale of the number of bits of each piece of information and is set responsive to the first synchronizing bit of a piece of information to commence counting the pulse signals from said pulse generating means, and a second counter coupled to said first counter for counting carry signals derived from said first counter and being reset in response to the second synchronizing bit of said piece of information;

said dividing means includes means for memorizing the contents of said reset second counter; and said signal generating means for generating said synchronizing signals includes a third counter which is set in accordance with the reset of said counter and for then commencing to count said pulse signals from said pulse generating means, a coincidence circuit coupled to said third counter and to said memorizing means for detecting coincidence between the contents of said third counter and the contents of said memorizing means, and a binary counter coupled to said coincidence circuit for counting the output of said coincidence circuit and for providing the synchronizing clock signals as a function of the carry signal derived from the binary counter.

5. A bar-coded information reading device comprising:

reading means for reading a number of pieces of coded information serially recorded on a recording medium, each piece of information including the same number of bits and having two synchronizing bits added thereto, one synchronizing bit being arranged immediately before, and the other synchronizing bit being arranged immediately after a respective piece of information, all of said bits being arranged at equal intervals on the recording medium;

a pulse signal generator;

counter means coupled to said pulse signal generator and which is set responsive to a first synchronizing bit located immediately before a piece of coded information for counting the pulse signals from said pulse signal generator;

means coupled to said counter means for resetting said counter means responsive to a second synchronizing bit located immediately after said piece of coded information;

said counter means including a first counter having a double scale of the number of bits of each piece of information and being set responsive to said first synchronizing bit to commence counting said pulse signals, and a second counter coupled to said first counter for counting carry signals derived from said first counter and being reset by said resetting means in response to said second synchronizing bit;

dividing means coupled to said counter means for dividing the contents of the reset counter means by the number of bits constituting a respective piece of information to determine the average per-bit reading time, said dividing means including means for memorizing the contents of said reset second counter; and means coupled to said dividing means and to said reading means for generating synchronizing clock signals which are a function of said average per-bit reading time for successively reading out the bits of each piece of information one-by-one;

said means for generating said synchronizing clock signals including a third counter which is set in accordance with the reset of said counter means and for then commencing to count said pulse signals from said pulse signal generator, a coincidence circuit coupled to said third counter and to said memorizing means for detecting coincidence between the contents of said third counter and the contents of said memorizing means, and a binary counter coupled to said coincidence circuit for counting the output of said coincidence circuit and for providing the synchronizing clock signals as a function of the carry signal derived from the binary counter.

6. An information reading device according to claim 5, wherein said pulse signal generator generates pulses of a constant frequency.

7. An information reading device according to claim 5, wherein the synchronizing bit that is provided at the rearmost part of one piece of coded information concurrently acts as the synchronizing bit provided at the foremost part of the succeeding piece of coded information.

* * * * *